(12) United States Patent
Zhang et al.

(10) Patent No.: US 12,392,860 B2
(45) Date of Patent: Aug. 19, 2025

(54) SYSTEM AND METHOD FOR EVENT RECOGNITION

(71) Applicant: IQ Works Limited, Chai Wan (HK)

(72) Inventors: Jian Zhang, Denistone East (AU); Yi Da Xu, Broadway (AU); Zhenguo Shi, Sydney (AU)

(73) Assignee: IQ WORKS LIMITED, Chai Wan (HK)

( * ) Notice: Subject to any disclaimer, the term of this patent is extended or adjusted under 35 U.S.C. 154(b) by 565 days.

(21) Appl. No.: 17/639,693

(22) PCT Filed: Sep. 1, 2020

(86) PCT No.: PCT/CN2020/112825
§ 371 (c)(1),
(2) Date: Mar. 2, 2022

(87) PCT Pub. No.: WO2021/043126
PCT Pub. Date: Mar. 11, 2021

(65) Prior Publication Data
US 2022/0291326 A1    Sep. 15, 2022

(30) Foreign Application Priority Data
Sep. 2, 2019    (HK) ................ 19129029.5

(51) Int. Cl.
*G01S 5/02* (2010.01)
*G06N 20/00* (2019.01)

(52) U.S. Cl.
CPC .......... *G01S 5/02521* (2020.05); *G06N 20/00* (2019.01)

(58) Field of Classification Search
CPC .......... G06N 3/044; G06N 3/08; G06N 20/00; G06N 3/045; G01S 5/02521; G01S 13/003; G01S 7/417
See application file for complete search history.

(56) References Cited

U.S. PATENT DOCUMENTS

| | | | |
|---|---|---|---|
| 8,217,759 B2 * | 7/2012 | Tessier | G06Q 10/06 340/572.1 |
| 11,374,952 B1 * | 6/2022 | Coskun | G06N 3/045 |
| 2019/0205771 A1 | 7/2019 | Lin et al. | |

FOREIGN PATENT DOCUMENTS

| | | |
|---|---|---|
| CN | 101977068 | 2/2011 |
| CN | 104459718 | 3/2015 |
| CN | 107015193 | 8/2017 |
| CN | 109544862 | 3/2019 |

\* cited by examiner

*Primary Examiner* — An H Do
(74) *Attorney, Agent, or Firm* — Renner, Kenner, Greive, Bobak, Taylor & Weber

(57) ABSTRACT

A system and a method for event recognition includes the steps of reading a signal transmitted over a defined space, wherein the signal reading includes signal information arranged to be affected by an event within the defined space; processing the signal information with a matching engine, wherein the engine is arranged to match the signal information with one or more associated event labels to recognize the event within the defined space.

28 Claims, 11 Drawing Sheets

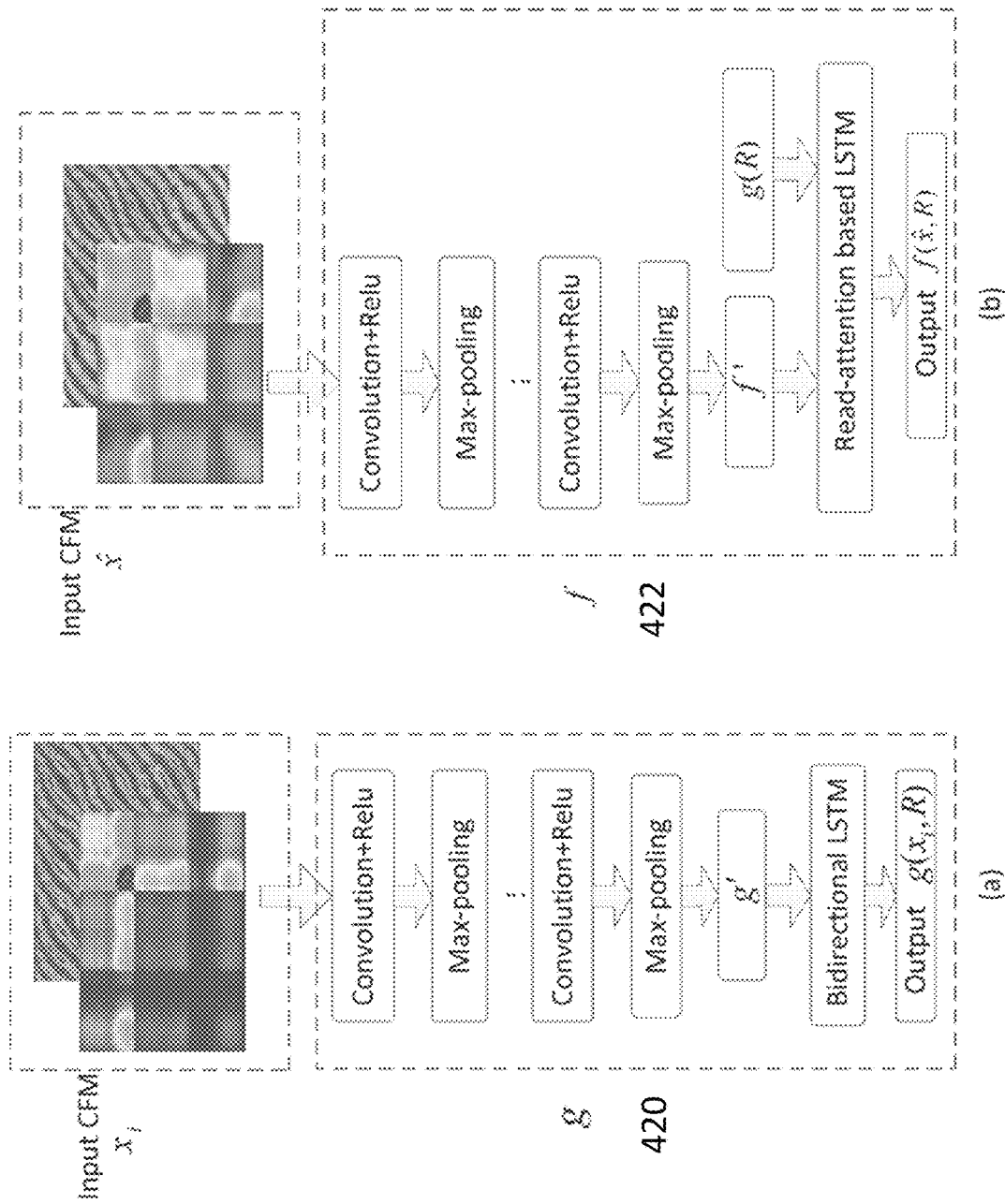

SYSTEM AND METHOD FOR EVENT RECOGNITION

TECHNICAL FIELD

The present invention relates to a system and method for event recognition, and particularly, although not exclusively, to a system and method for recognizing events or activities by detecting and processing variations and interferences of electromagnetic signals.

BACKGROUND

The supervision and detection of events or activities in a particular space or area is a desirable task in data collection, surveillance and security. However, such tasks are resource intensive and costly as it requires the deployment of monitoring personnel to continuously supervise an area.

In more recent times, computer systems have been built in an attempt to reduce the work carried out in this area by human beings. Computer systems, using Artificial Intelligence and Machine Vision have been used to detect events or activities. However, despite improvements in computing technology, it is nonetheless difficult to conduct surveillance of a space or area as it is difficult to accurately recognize the events that are taking place therein. In turn, false detections and erroneous alerts have made such systems difficult to use, and at times, create even more work for human operators due to false alarms, errors or simply missed detections.

Attempts have been made to solve these problems, but often at immense costs either by human intervention, training or computational resources. This in turn has increased the costs to build and deploy such systems and thus making it difficult for this technology to be adopted in mainstream usage.

SUMMARY OF THE INVENTION

In accordance with a first aspect of the present invention, there is provided a method for event recognition comprising the steps of:
 reading a signal transmitted over a defined space, wherein the signal reading includes signal information arranged to be affected by an event within the defined space;
 processing the signal information with a matching engine, wherein the engine is arranged to match the signal information with one or more associated event labels to recognize the event within the defined space.

In an embodiment of the first aspect, the matching engine includes a learning network arranged to be trained to match the signal information with the one or more associated event labels.

In an embodiment of the first aspect, the learning network is machine trained with a training data set having a plurality of signal information and at least one label associated with the plurality of signal information.

In an embodiment of the first aspect, the learning network is arranged to extract features from the training data set.

In an embodiment of the first aspect, the training data set includes a reference data set and a target data set.

In an embodiment of the first aspect, the step of extracting features from the training data set includes embedding the reference data set.

In an embodiment of the first aspect, the step of extracting features from the training data set further includes embedding the target data set.

In an embodiment of the first aspect, the embedding is performed by one or more deep learning networks.

In an embodiment of the first aspect, the deep learning network arranged to embed the reference data set to extract reference data features is performed by a convolution neural network (CNN) with a bi-directional long short term memory network (LSTM).

In an embodiment of the first aspect, the deep learning network arranged to embed the target data set to extract target data features is performed by a convolution neural network (CNN) with a read attention based long short term memory network (LSTM).

In an embodiment of the first aspect, the learning network is further arranged to classify the extracted features and label these classified extracted features with the one or more associated event labels.

In an embodiment of the first aspect, the step of classifying the extracted features includes comparing the extracted features of the reference data set and the extracted features of the target data set and identifying any similarities between the extracted features.

In an embodiment of the first aspect, the step of comparing for similarities between the extracted features of the reference data set and the extracted features of the target data set is performed with a cosine similarity function.

In an embodiment of the first aspect, the reference data set is obtained from a previously scene environment (PSE).

In an embodiment of the first aspect, the target data set is obtained from both the previously scene environment (PSE) and a new environment.

In an embodiment of the first aspect, the signal information in the target data set is unlabelled with an associated event.

In an embodiment of the first aspect, the signal information includes one or more characteristics of the signal.

In an embodiment of the first aspect the one or more characteristics of the signal includes amplitude, phase, channel, angle of arrival or any other physical characteristic.

In an embodiment of the first aspect, further include the step of pre-processing the signal information for processing by the matching engine.

In an embodiment of the first aspect, the step of pre-processing the signal information includes removing activity unrelated information.

In accordance with a second aspect of the present invention, there is provided a system for event recognition comprising:
 a signal reader arranged to read a signal transmitted over a defined space, wherein the signal reading includes signal information arranged to be affected by an event within the defined space;
 an activity recognition processor arranged to process the signal information with a matching engine, wherein the engine is arranged to match the signal information with one or more associated event labels to recognize the event within the defined space.

In an embodiment of the second aspect, the matching engine includes a learning network arranged to be trained to match the signal information with the one or more associated event labels.

In an embodiment of the second aspect, the learning network is machine trained with a training data set having a plurality of signal information and at least one label associated with the plurality of signal information.

In an embodiment of the second aspect, the learning network is arranged to extract features from the training data set.

In an embodiment of the second aspect, the training data set includes a reference data set and a target data set.

In an embodiment of the second aspect, the learning network extracts features from the training data set by embedding the reference data set.

In an embodiment of the second aspect, the learning network extracts features from the training data set by embedding the target data set.

In an embodiment of the second aspect, the embedding is performed by one or more deep learning networks.

In an embodiment of the second aspect, the deep learning network arranged to embed the reference data set to extract reference data features is performed by a convolution neural network (CNN) with a bi-directional long short term memory network (LSTM).

In an embodiment of the second aspect, the deep learning network arranged to embed the target data set to extract target data features is performed by a convolution neural network (CNN) with a read attention based long short term memory network (LSTM).

In an embodiment of the second aspect, the learning network is further arranged to classify the extracted features and label these classified extracted features with the one or more associated event labels.

In an embodiment of the second aspect, the step of classifying the extracted features includes comparing the extracted features of the reference data set and the extracted features of the target data set and identifying any similarities between the extracted features.

In an embodiment of the second aspect, the step of comparing for similarities between the extracted features of the reference data set and the extracted features of the target data set is performed with a cosine similarity function.

In an embodiment of the second aspect, the reference data set is obtained from a previously scene environment (PSE).

In an embodiment of the second aspect, the target data set is obtained from both the previously scene environment (PSE) and a new environment.

In an embodiment of the second aspect, the signal information in the target data set is unlabelled with an associated event.

In an embodiment of the second aspect, the signal information includes one or more characteristics of the signal.

In an embodiment of the second aspect, the one or more characteristics of the signal includes amplitude, phase, channel, angle of arrival or any other physical characteristic.

In accordance with a third aspect of the present invention, there is provided a system for localization of an object comprising:
  segmentation processor arranged to segment a space into multiple segments, wherein a signal is propagated within the space;
  an event recognising module arranged to recognise an event in the multiple segments by a method in accordance with any embodiment of the first aspect of the invention; and
  a location output processor arranged to determine an estimated location based on the events recognised in the multiple segment.

In an embodiment of the third aspect, the system further includes a fingerprint database arranged to store the events recognised by the event recognising module in its segment.

BRIEF DESCRIPTION OF THE DRAWINGS

Embodiments of the present invention will now be described, by way of example, with reference to the accompanying drawings in which:

FIG. 5A is a block diagram illustrating the process flow of a reference data set embedding function of the matching network (MatNet) of FIG. 4B;

FIG. 5B is a block diagram illustrating the process flow of a target data set embedding function of the matching network (MatNet) of FIG. 4B;

DETAILED DESCRIPTION OF THE PREFERRED EMBODIMENT

Figure 1:
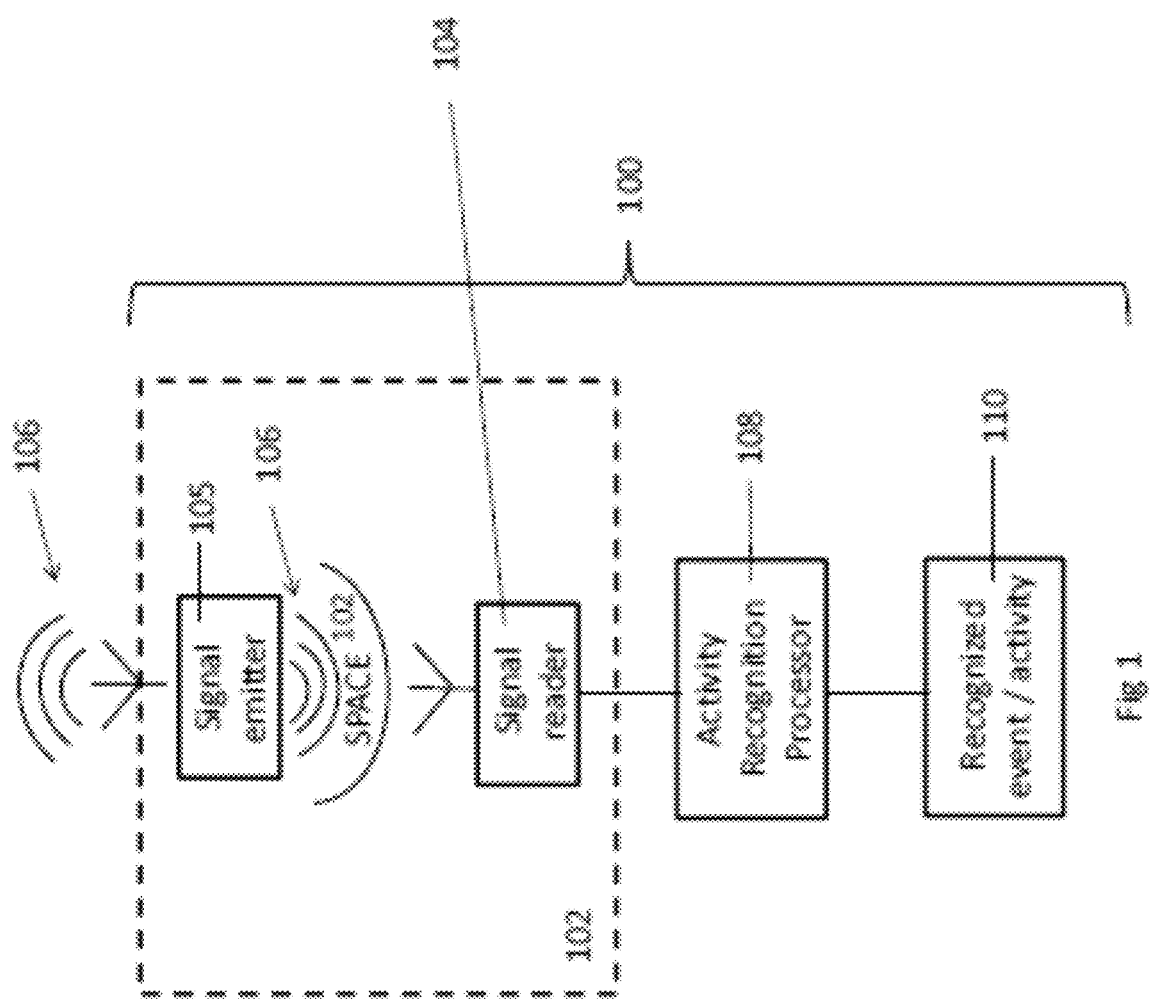
FIG. 1 is a block diagram of a system for event recognition in accordance with one embodiment of the present invention.

Referring to FIG. 1, there is illustrated an embodiment of a system for event recognition comprising:
  a signal reader arranged to read a signal transmitted over a defined space, wherein the signal reading includes signal information arranged to be affected by an event within the defined space;
  an activity recognition processor arranged to process the signal information with a matching engine, wherein the engine is arranged to match the signal information with one or more associated event labels to recognize the event within the defined space.

In this embodiment, the system for event recognition 100 is arranged to receive and process signal information associated with a signal transmission over a space 102 or area so as to recognize an event or activity taking place within the space or area 102. Preferably, the system for event recognition 100 includes a signal reader 104 which is deployed to receive the signal 106 that is transmitted over the defined space 102. This signal 106 may include any electro-magnetic signal (EMF) such as radio signals that may be transmitted by a signal emitter 105 over a defined space or area 102 and is received by a suitable signal reader 104. In the example embodiments described below, the inventors have used WiFi signals to perform an example implementation, although it is appreciated that any type of signals, provided the appropriate reader and emitter is used, may operate as part of the system for event recognition 100. Such signals may even include non-EMF signals, such as any type of medium or its manipulation that may provide the functionality of data transmission. As an example, the movement of a fluid, such as air or liquid within a space, if recorded, may be considered a signal that may operate with an adapted form of the system for events recognition. In such an example, the signal emitting device may be an air flow source, such as a fan, whilst the signal reader may be one or more air flow sensors, temperature gauge, or air pressure sensors.

An activity or event within the space may disrupt the airflow detected, change the air's temperature/humidity, alter the air pressure or in other ways affect the physical characteristics of the air or airflow. In turn, by allowing for such air or airflow characteristics to be measured as a form of signal information over the course of an activity or event, the information can be processed to determine the event or activity.

As the signal reader 104 receives and reads the signals 106 that are transmitted by the signal emitter 105. Information relevant to the signal, referred to as signal information or signal data, is received by the signal reader 104. Such signal information may include the signal's characteristics, including the signal's physical characteristics such as signal strength (amplitude), phase, angle of arrival, etc. These characteristics may be subjected to variations when one or more specific activities or events take place within the defined space 102. Accordingly, these variations may be read by the signal reader 104 and processed by the activity recognition processor 108 to determine the event or activity that is taking place within the defined space 102.

In this embodiment, the signal reader 104 is arranged to read the signal 106 so as to obtain one or more characteristics of the signals that are received. These characteristics, referred to as signal information, may in turn be inputted to the activity recognition processor 108. The activity recognition processor 108 is arranged to process the characteristics of the signals received so as to determine the event or activity which took place, and provide this as an output to a user 110, or for further processing to determine the location of the activity or event within the space 102.

In different embodiments, the activity recognition processor 108 may be implemented in various manners and may be built with a rule based system whereby specific types of signal characteristics previously observed may infer a specific activity or event. In another embodiment, the processor 108 may be implemented by use of a machine learning based system which can learn, after training, the different signal characteristics and their associated specific events or activities such that when new signal information is provided, the characteristics of the signal may be matched to specific events or activities that have been previously trained to be similar to the characteristics of the signal. Similarly, in certain examples, both a rule based system and a machine learning based system may be used in combination to obtain the most desirable result.

In the present embodiments described below, the processor 108 uses a machine learning system, such as a matching engine that includes a matching network designed to learn from previously obtained signal characteristics and classify newly inputted signal characteristics with specific activities or events which would match the inputted signal characteristics. Once a match is determined, the specific activity or event is in turn presented as an output, and thus allowing a user or subsequent process to recognize the activity or event which has occurred within the space. A more detailed description of these example embodiments will be presented with reference to FIGS. 2 to 6 below.

Embodiments of the system for event recognition 100 may be deployed in any environments so as to monitor and recognize any events or activities that are taking place within the environment. The system 100 may use radio equipment such as WiFi transmitters and receivers which are commonly available, to monitor the environment. In turn, the system operates to allow, for example, the detection and recognition of a human activity within a defined space or indeed any specific event or activity by any persons, animals or objects that may affect the signal transmitted between the signal transmitter and the receiver. Such activities or events may include sporting activities, e.g. running, sitting, dancing, walking, or, events such as the detection of falls by persons, animals or objects, or other events such as security events or events in response to a particular situation.

As an example, the system 100 may be deployed in a room, hallway, vehicle, carriage or any other space to detect activities undertaken by persons within the space. A school, for example, may be able to use the system 100 to recognize the activities of its students. A gym, for example, may be able to monitor the sporting activities of its members. A store may be able to monitor the activities of its customers. It can be appreciated that the Application of the system can be found in various industries, including agriculture, mining, security, retail, education, recreation, gaming, healthcare, transport and any other industry where there is an advantage to monitor events or activities of persons, animals or objects within a predefined space or area. It is also important to appreciate that the system 100 may be deployed in various mediums and is not limited to spaces such as rooms or areas with or without an atmosphere. As an example, the system may also operate underwater, such as in a fish tank, pool or aquaculture pond to monitor for human activities such as swimming, diving, or to monitor for the presence or activities of certain aquatic life within a tank, body of water or underwater space.

Figure 2:
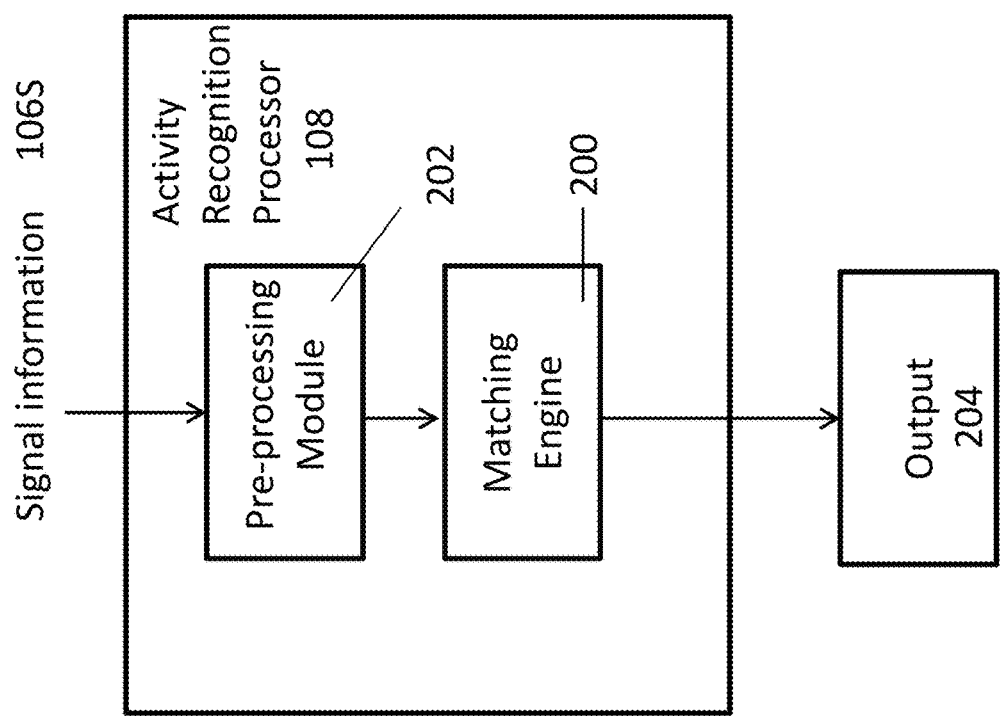
FIG. 2 is a block diagram of an activity recognition processor of FIG. 1.

With reference to FIG. 2, there is illustrated a block diagram of an example activity recognition processor 108. In this example, the activity recognition processor 108 includes an optional pre-processing module 202 arranged to pre-process the signal information 106S that have been received by the receiver 104 before it is inputted into the matching engine 200. The function of this pre-processing module 202 is to reduce the amount of signal information or data for input into the matching engine 200 and to remove any noise or static data that is unrelated to activities or events. In turn, the pre-processing module 202 may improve the quality of the input to the matching network 200 for subsequent processing. As it can be appreciated, the pre-processing module 202 is optional since the matching network 200 may be able to process any signal information in any volume, but the pre-processing of the signal information or data 106S may improve the accuracy of the output of the matching network 200 and may also improve the quality of training of the matching network 200 by reducing the amount of training data required for the matching network 200 to operate at a suitable level of accuracy. An example of the pre-processing module 200 and its operations will be described further below with reference to FIG. 3.

In this example, once the pre-processing module 202 processes the signal data 106S, the data 106S is then inputted into the matching network 200. Preferably, the matching network 200 is a machine learning network arranged to be pre-trained with signal data 106S and associated activities or events information which is referenced to the signal data with labels. In turn, once the network 200 is trained, new signal data as received by the signal receiver 104 can be put through the matching network 200 to identify or recognize the activity or event. This activity or event, which has now been recognized as based on a match between the signal data and a referenced activity or event as previously learnt by the matching network 200 may then be provided as an output 204 to a user, or it may be further processed to determine the location of the activity or event within the predefined space or area.

Figure 3:
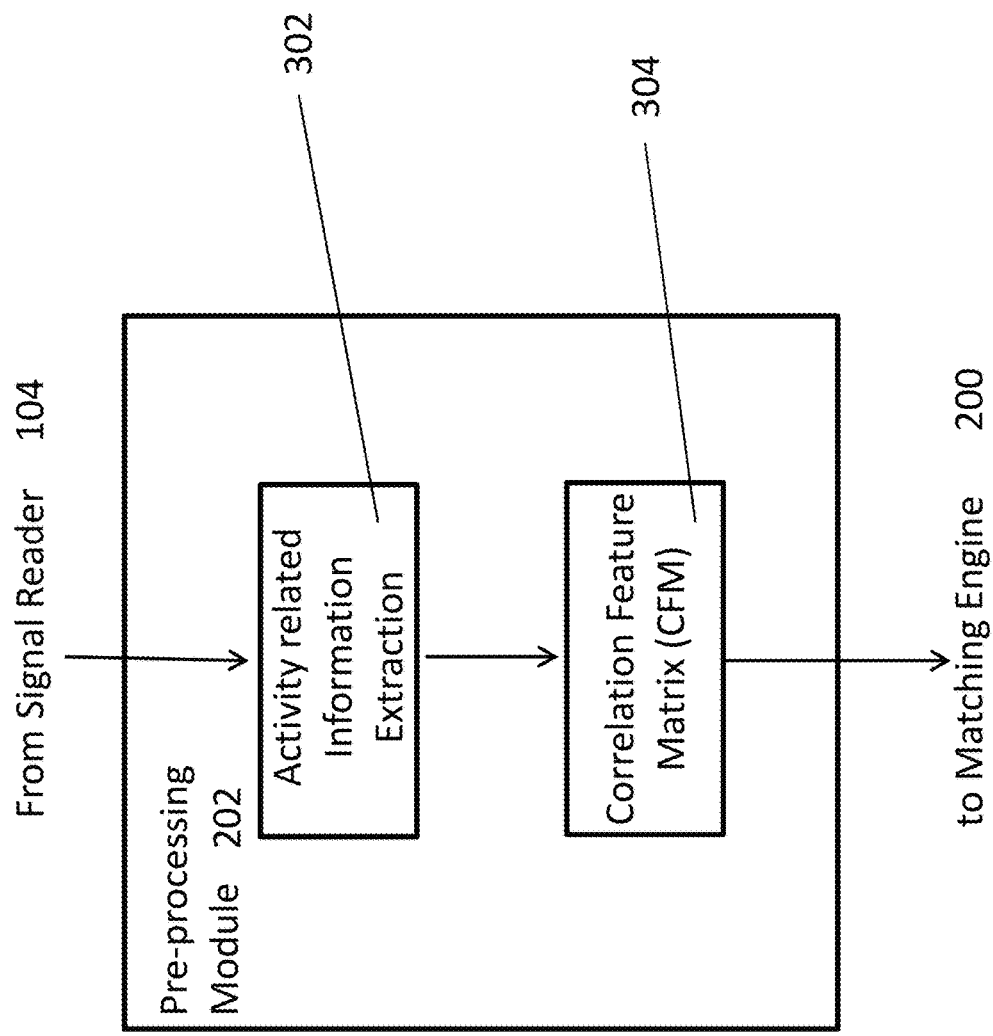
FIG. 3 is a block diagram of a pre-processing module of the activity recognition processor FIG. 2.

With reference to FIG. 3, there is illustrated a block diagram showing the processes of the pre-processing module 202. In this embodiment, the module 202 performs two processing tasks to pre-process the signal data from the receiver 104. The first is an extraction process 302 whereby activity related information is extracted, followed by the construction of a correlation feature matrix (CFM) 304. These processes 302, 304, will be described further below with reference to an example embodiment where a WiFi signal is used as an implementation signal for an embodiment of the system for event recognition 100. As mentioned earlier, other forms of signals, including various forms of EMF signals or other signals that may be affected by an activity or event may be used by the system 100 to recognize the activity or event when the system 100 is adapted with suitable equipment to transmit and receive the signals.

In this example embodiment, where WiFi signals are used, the receiver 104 is arranged to receive the signal from the emitter 105. The WiFi signals are then arranged to be processed to recognize a particular event or activity. As per the standards of WiFi receivers, signal information, including information relating to the characteristics of the WiFi signal is obtained as channel state information (CSI).

Once received, the CSI represents the variation of wireless channels induced by activities or events. The CSI is collected by the WiFi receiver which is then pre-processed by a pre-processing module 202 to reduce activity unrelated information. Such activity unrelated information may include scattering signals from the background objects or noise. In turn, the pre-processing module 202 may be able to compress and reduce the signal input for the matching network 200 whilst also enhancing the feature signals. This processed CSI by the pre-processing module 200 may be referred to as an enhanced channel state information (CSI) set or enhanced CSI.

Preferably, after the CSI is pre-processed into an enhanced CSI, the enhanced CSI may include mostly, if not only, the activity-related signal information. The enhanced CSI may then be further processed whereby the correlation of the enhanced CSI is then calculated so as to generate a correlation feature matrix (CFM) 304. The CFM may in turn contain condensed activity-related information, with largely reduced dimension compared to original CSI matrix, offering an advantage of a reduce data set for input to the matching engine 200. These are in turn transmitted and inputted to the next stage where the matching engine 200 is utilized to automatically learn and extract the hidden features from the CFM for activities or events classification.

In this embodiment, when the system 100 is deployed in an indoor environment covered by a WiFi network, a person may be moving around or otherwise undertaking some activity. Such activities will unavoidably change the wireless signal propagations, with some of the WiFi signals being absorbed, diffracted, reflected or scattered. In turn, such activity may change the physical characteristics of the WiFi signal leading to variations of amplitude, phase shift and the number of multiple paths. Since these variations, which can be detected, measured and recorded, contain characteristics of different events or activities, including human activities, it is possible to realize the type of activity or event which has taken place. Thus the operation of Human Activity Recognition (HAR) may be achieved by utilizing the CSI measurements from the WiFi signals.

In accordance with one example embodiment where WiFi signals are used, the system 100 is implemented to use an Intel 5300 network interface card (NIC) (an available commercial and off the shelf (COTS) WiFi device) as a WiFi signal receiver. This device is able to acquire and collect CSI of a WiFi signal. According to the protocol of IEEE 802.11n, CSI tools may be used to extract the CSI from 30 subcarriers for each pair of transmitter-receiver antennas. It should be appreciated that other receiver devices may be used such that other forms of radio signal information, such as radio CSI and/or RSSI information may also be obtained.

In this example, the CSI vector h(i), acquired from the i-th packet, is written as:

$$h(i) = [H_{1,1}(i), \ldots, H_{1,m}(i), \ldots, H_{n,m}(i), \ldots, H_{N,M}(i)]^T \quad (1)$$

where, $H_{n,m}(i)$ stands for the CSI measurement at the mth subcarrier in the nth wireless link;

M denotes the total number of available subcarriers in each wireless link;

N represents the total number of wireless links, and $N=N_t \times N_r$ where $N_t$ and $N_r$ are the number of antennas at the transmitter and receiver, respectively; and T stands for the transpose operation.

The CSI matrix H, is therefore made up of CSI vectors obtained from I packets and is therefore represented by $$H = [h(1), \ldots, h(i) \ldots, h(I)] \quad (2)$$

In this example embodiment, the pre-processing processor is arranged to reduce the CSI for static background objects and/or to condense the CSI matrix. In the example embodiments, the CSI matrix H may represent the raw CSI measurements and contains multiple channel paths from static background objects. Accordingly, it would therefore include a significant amount of activity-unrelated information.

Such information is generally environment dependent and can largely reduce the robustness of the operation of the system. It may also affect the quality of extracted features in the subsequent processing within the matching engine. The size of H may also be quite large, and in turn may be computationally intensive and time-consuming to utilize H directly for training and classification using learning based networks such as neural networks.

To address these problems, embodiments of the system may use a unique CSI correlation feature extraction (CCFE) method 304 that consists of two main steps: The first is referred to as activity-related information extraction, followed by a second step of correlation feature extraction.

In the first step, a linear recursive operation may be used to construct the CSI for static objects and then subtract it from the received signal. In turn, the output is expected to have significantly reduced activity-unrelated information, leaving only activity related information.

Following this step, the correlation of the output channel matrix from the abovementioned first step, that is, the activity-related information extraction, is processed to obtain a correlation feature matrix (CFM). In some examples, the CFM contains condensed activity-related information, with largely a reduced dimension compared to original unprocessed CSI matrix H.

To explain the operations of the pre-processing module and the subsequent processing by the matching engine, assume $D_{en}^A$ and $D_{en}^\Psi$ are variables to denote the amplitude and phase matrices of the output from the CSI pre-processing module 202. It should be appreciated that for the purpose of describing this embodiment of the invention, the amplitude and phase matrices are considered. Other signal characteristics may also be used as inputs to the matching engine 200.

Figure 4A:
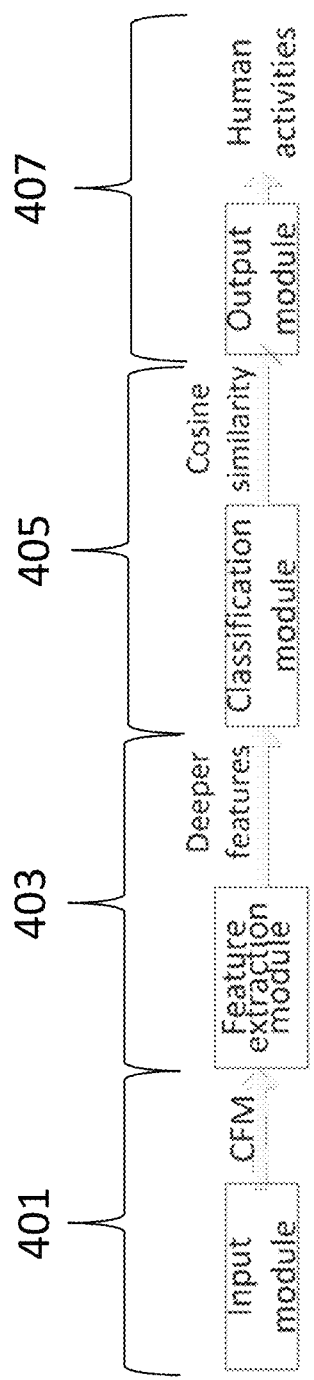
FIG. 4A is a block diagram illustrating the stages of the activity or event recognition processes of a matching engine of FIG. 1.
Figure 4B:
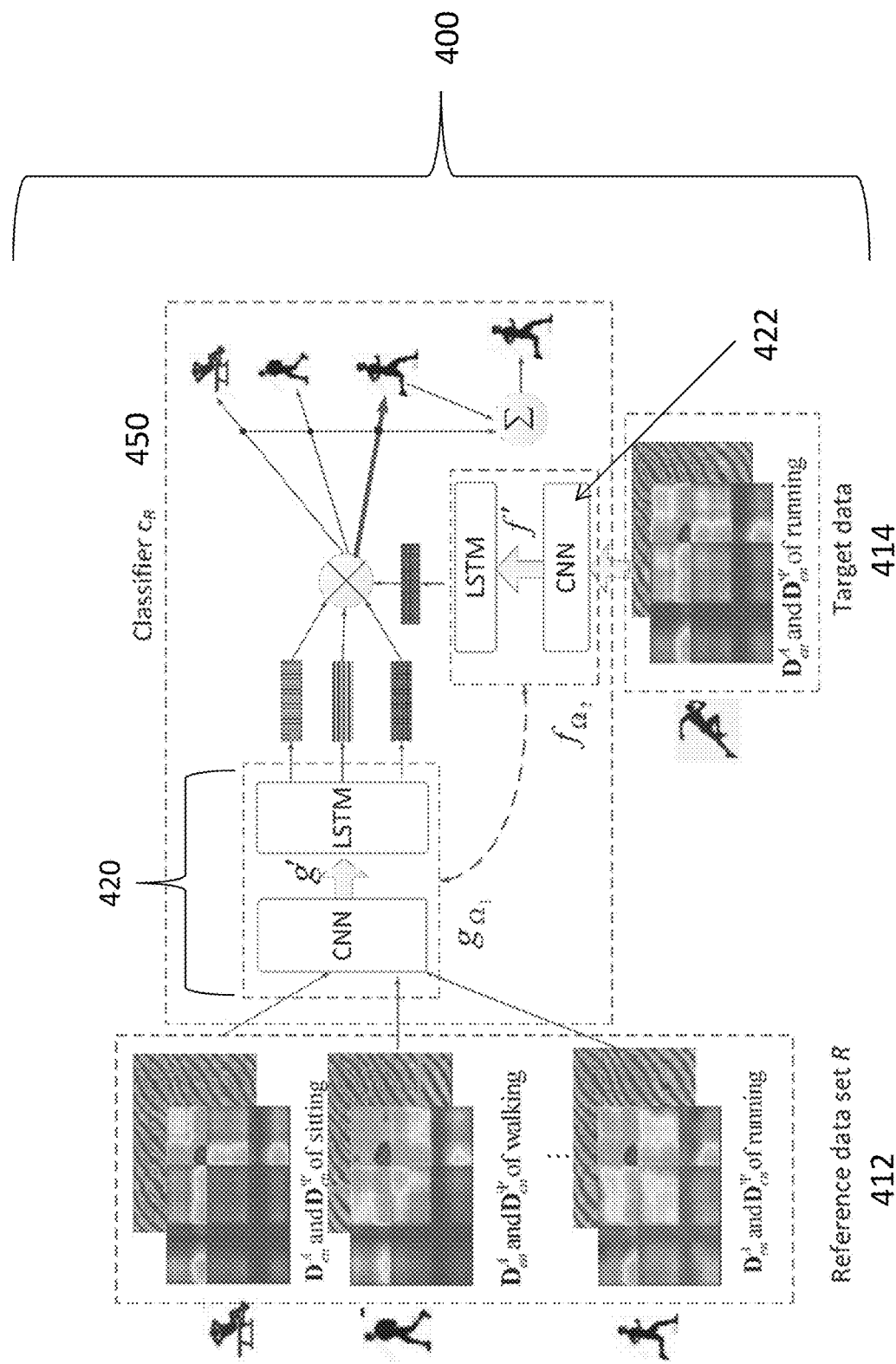
FIG. 4B is a block diagram illustrating the structure of a matching network (MatNet) of the matching engine of FIG. 4A.

After the pre-processing modules 202 completes the processing of the channel state information (CSI) and generates the correlation feature matrix (CFM), the CFM is then inputted into a matching engine 200 arranged to recognize the activity or event. As shown in FIGS. 4A and 4B, an embodiment of the matching engine 200, represented in a block diagram illustrating the process flow (FIG. 4A) and in a block diagram illustrated the structure of the matching network of the matching engine 200 (FIG. 4B) is shown. This engine 200 is arranged to recognize human activities or any other events using a matching network (MatNet) 400 which is arranged to automatically learn and extract hidden information and features from the CFM and in turn, allowing for the trained network 400 to also extract features from characteristics of a signal obtained in an environment in which it would be desirable to recognize the activity or event which is taking place or has taken place previously within the environment.

Preferably, to realize feature extraction, the MatNet 400 is arranged to automatically learn and extract deeper features from the CFM. In this example, the arrangement of the MatNet 400 together with a training strategy described below, may be able to bridge a gap between a new environment, also referred to as a testing environment and a previous environment such as a lab or test centre where the training is provided from before the system 100 is deployed in the new environment. As such, it is preferred that the training process can be provided with a data set from the previous environment and at least one sample data set from the new environment so as to facilitating a one-shot learning in the testing environment.

This example MatNet 400 design and training arrangement can be described as an artificial recreation of a matching network that has been trained to perform matching of activities or events in one controlled environment (the previously seen environment, PSE). However, as the new test environment is different to the previously seen environment, some training in the new test environment is required. This arrangement allows the previous learning to be adapted to operate with the learning in the new test environment. Such a design could be described in terms of modelling the human brain in which the human being has been trained in one environment, and then proceeding to adapt that knowledge when the human being is required to operate in a new environment after a short training session of understanding the new environment. In this example, the human is adapting in the new environment by applying existing knowledge of the previously seen environments into the new environment.

In order to recreate a similar function with the MatNet 400, in one example, one or more deep learning network is deployed within the MatNet 400 to be firstly trained offline using the training data. This training data can include a large volume of training data from a previously scene environment (PSE) and a smaller sample of data from the new environment, which as it will be explained below, due to the arrangement of the MatNet 400 and the training strategy, allows relationships or interconnections to form between the two sets of training data such that after the training is completed, the matching engine can perform activity or events recognition, and in particular to human activity recognition (HAR) online.

This arrangement of the MatNet 400 is particularly advantageous as the overall training time required of the system for recognizing events 100 may be substantially reduced when it is deployed in a working environment. As indicated earlier, a substantial training process with large data sets can be performed before the system 100 is deployed so as to build up a significant amount of learned behaviour (knowledge) within the MatNet 400. This may be performed by the manufacturer of the system 100 before it is deployed to an end user. However, once the system 100 is deployed in its working environment, substantial training or large training sets are generally undesirable as end users may not have time, resources or data to train the system 100 to operate correctly or accurately. By having examples of the present MatNet 400 arrangement, the MatNet 400 allows the minimal training of the system 100 in its working environment and thus the end user can use minimal resources to train the system 100 to achieve accurate recognition results.

In this example embodiment, the MatNet 400 is implemented with a neural network structure further enhanced with external memory. Such an arrangement may be advantageous so as to improve the environmental robustness via one-shot learning. In this example, the input to the MatNet 400 is the enhanced CSI (e.g., $D_{en}^{A}$ and $D_{en}^{\Psi}$) although other signal characteristics are also possible. A unique example training strategy may also be used to better utilizing the properties of this MatNet 400 structure, which may be capable of accomplishing a "sensing task" using at the minimum, one set of training data from the new environment.

In this embodiment, different activities or events may be successfully recognized by the MatNet through four main stages as shown in FIG. 4A. These include:

1. Input Stage 401—This first stage is to provide the signal information (characteristics of the signals) as an input (including the signals from a reference data set 412 and a target data set 414, both of which may be used to train the MatNet 400) for input into the MatNet 400. Preferably, the characteristics of the signals are represented by a CFM and thus inputted are the CFMs obtained from the PSE. In one example, the CFMs obtained from the PSE could be used as the reference data set 412 whilst the CFM from the new/testing environment, either on its own or combined with samples of CMFs from the PSE, could be used as the target data set 414;
2. Feature extraction Stage 403—This stage is to extract distinguishable features from the reference data set 412 and target data set 414. This would include the extraction of deeper and transferable features from input data that can be extracted by deep architectures of MatNet 400 (e.g. a Convolution Neural Network (CNN) combined with a Long Short-Term Memory Network (LSTM)). The relationship between the extracted features may also built in this stage;
3. Classification Stage 405—This stage may estimate the label of the target data 414 using the features extracted from the Feature Extraction Stage 403. The extracted features may then be used to classify different activities. This is performed, for example, by calculating the similarity between them. In turn, the MatNet 400 is able to provide the classification results in the output stage 407 (below), and;
4. Output Stage 407—This stage is to provide the final result of the MatNet 400, which would be a classification of a specific activity or event. For example, the target data shows a person is "running" or "walking", "sitting", or "exercising".

With reference to FIG. 4B, there is provided a block diagram illustrating an example architecture of a MatNet 400 which may be used by the matching engine 200 to provide an activity or event recognition function. In this example, the MatNet 400 includes two artificial learning network structures. These include two deep learning architectures:

1—A Convolution Neural Network (CNN) with bidirectional Long Short Term Memory (LSTM) 420; and,
2—A CNN with Read-attention based LSTM 422.

The first deep learning architecture 420 is used to learn and extract features from data samples in a reference data set 412, which may be the data that is collected from a previously scene environment (PSE). Preferably, the CNN operates to extract deeper features, whilst the bidirectional LSTM operates to choose which feature that may better describe/distinguish different activities.

The second deep learning architecture 422 is to extract features from a target data set 414, which may be data that is collected from a new, testing or target environment or a combination of such data from the new testing or target environment with samples of data from the PSE. Preferably, the CNN is the same as that in the deep learning architecture for the reference data set, while the LSTM structure may be different to that of the reference data set, and instead uses a read-attention based LSTM. In these examples, a read-attention based LSTM may be able to more effectively build the relationship between the features extracted from samples in the reference data set 412 and target data 414.

In some examples, the input of read-attention based LSTM includes the features not only extracted from target data set 414 but also from reference data set 412. In this example, transferable and discriminate features may be extracted with the help of the read-attention based LSTM. In turn, the matching network 400 may be better able to build the relationships between the features extracted from the signal data (CFMs) obtained from the PSE and the new/testing environment. Overall, this may reduce the training effort necessary to see that the MatNet 400 is able to operate at a desired level of accuracy.

As shown in the example MatNet of FIG. 4B, the MatNet 400 is arranged to build a classifier $c_R$ 450 for each given reference data set R 412. Thus mapping R to $c_R$, $R \to c_R(\cdot)$. This classifier $c_R$ 450 will effectively classify what the activity or event is as detected from the inputted characteristics of the signals that have been obtained from the receiver.

As shown, the input stage of the MatNet 400 is arranged to receive the reference data set R 412 and the target data 414. The input of MatNet 400 includes two parts: reference data set (R) 412 and target data 414. The reference data, R, may be CFMs obtained by CCFE method from PSEs, which may include sufficiently labelled samples of all interested activities or events. Such a reference data set R, may indeed be sizeable and includes many labels of specific activities or events that had previously been recorded and associated with a specific signal characteristics.

The target data 414 may be presented as CFMs of different activities or events obtained from a new or testing environment. The data may be unlabelled, that is, the signal information may not have been associated or otherwise labelled with a corresponding activity or event. In an offline training stage, R 412 may then be used to help MatNet 400 to learn how to extract deeper and transferable features for different activities or events. In the online sensing stage, R 412 may act as a reference to label the sensing data (e.g. the target data 414) by calculating the similarity between them, thereby distinguishing different activities or events.

As shown in FIG. 4B, let (x,y) stand for the CFM-label pairs, $x = \{D_{en}^A, D_{en}^\Psi\}$, is the input CFM with a size of NM×NM×2, y is the output label for the corresponding human activity. Then the reference data set R 412 with $N_k$ samples can be written as:

$$R = \{(x_i, y_i)\}_{i=1}^{N_k} \qquad (3)$$

The output of MatNet 400 is the estimated class (label) for an input target data 414. Thus, the probability distribution of the output $\hat{y}$ for a given target sample $\hat{x}$ may be defined as:

$$P(\hat{y}|\hat{x}, R) \triangleq R \to c_R(\hat{x}) \qquad (4)$$

where P stands for the probability distribution, which is parameterized by the CNN and LSTM. As a result, the estimated output label $\hat{y}$ for a reference data set R 412 and a given input $\hat{x}$ can be obtained by $$\hat{y} = \operatorname*{argmax}_{y} P(y|\hat{x}, R) \qquad (5)$$

It is then necessary to extract distinguishable and generalized features from the reference data $x_i$ (obtained from R 412) and the target data $\hat{x}$. In this embodiment, two deep learning architectures g 420 and f 422, which operate as embedding functions, are used to extract features from $x_i$ and $\hat{x}$, respectively. As shown in FIGS. 5A and 5B. The g 420 and f 422 functions are designed to embed $x_i$ and $\hat{x}$ fully conditioned on the whole reference data set R 412. Accordingly, g 420 and f 422 can be represented as $g(x_i, R)$ and $f(\hat{x}, R)$, respectively. From FIG. 5(A), g 420 consists of a CNN with a bidirectional LSTM with input, $x_i$, as a CFMs obtained from the reference data set R 412 using the abovementioned example CCFE method.

In some example experimentations and trials undertaken by the inventors, a classical CNN architecture that includes several stacked modules, e.g. convolution layer, Relu non-linearity and max-pooling layer. The output of CNN, $g'(x_i)$, is fed into the bidirectional LSTM as the input data to further extract distinguishable features over the whole reference data set R. The output, $g(x_i, R)$, is the discriminate and generalized features extracted from $x_i$. The value of $g(x_i, R)$ can be obtained by $$g(x_i, R) = \vec{h}_i + \overleftarrow{h}_i + g'(x_i) \qquad (6)$$

$$\vec{h}_i, \vec{c}_i = \mathrm{LSTM}(g'(x_i), \vec{h}_{i-1}, \vec{c}_{i-1}) \qquad (7)$$

$$\overleftarrow{h}_i, \overleftarrow{c}_i = \mathrm{LSTM}(g'(x_i), \overleftarrow{h}_{i+1}, \overleftarrow{c}_{i+1}) \qquad (8)$$

where $\vec{h}_i$ and $\vec{c}_i$ represent the output and cell of the forward LSTM, respectively; $\overleftarrow{h}_i$ and $\overleftarrow{c}_i$ stand for the output and cell of the backward LSTM, respectively.

Specifically, g is a function of the whole reference set R, and may play a key role in embedding $x_i$, which is especially useful when an element $x_j$ is very close to $x_i$. This is particularly advantageous as in the situation where if $x_i$ and $x_j$ are input features of two similar activities (e.g., sitting and sitdown), respectively, g 420 can be trained to map $x_i$ and $x_j$ to two distinguishable spaces considering the whole reference data set 412.

An example of the structure of the f function 422 is shown in FIG. 5B. In this example, the function includes a CNN and LSTM arrangement. Its input, $\hat{x}$, is the CFM as obtained from the target data 414.

Preferably, as in this example, the CNN architecture is the same as that in g, while the LSTM structure is different and uses a read-attention based LSTM. $f(\hat{x},R)$ is the output of $f$, which contains deeper and transferable features extracted from $\hat{x}$. Let attLSTM(·) denote the read-attention based LSTM, for a given target sample $\hat{x}$, the output of attLSTM(·) over the whole reference data set R (i.e., $f(\hat{x},R)$) can be written as:

$$f(\hat{x},R)=\text{attLSTM}(f'(x),g(R),N_p) \tag{9}$$

where $f'(\hat{x})$, the extracted feature via CNN (similar to g above), is the input of read-attention based LSTM; g(R) denotes the feature data set obtained by embedding each sample $x_i$ from the reference data set R via g; and $N_p$ represents the number of unrolling steps in LSTM.

The input of read-attention based LSTM includes the features not only extracted from $f'(\hat{x})$ but also from g(R). This helps the read-attention based LSTM to build the relationship between the features extracted from PSEs and testing/new environment. In this way, $f$ is able to extract the transferable and generalized features $f(\hat{x},R)$ from the input data.

For the $n_p$th processing step, the state of the read-attention based LSTM can be expressed as follows:

$$h_{n_p}=\hat{h}_{n_p}+f'(\hat{x}) \tag{10}$$

$$\hat{h}_{n_p},c_{n_p}=\text{LSTM}(f'(x),[h_{n_p-1},r_{n_p-1}],c_{n_p-1}) \tag{11}$$

Where $r_{n_p-1}$ stands for the read-out from g(R) and is concatenated to $h_{n_p-1}$. $r_{n_p-1}$ can be represented as $$r_{n_p-1}=\Sigma_{i=1}^{N_s}a(h_{n_p-1},g(x_i))g(x_i) \tag{12}$$

where $N_s$ is the length of g(R); a(·,·) denotes the attention function in the form of softmax, and is given by $$a(h_{n_p-1},g(x_i))=\text{softmax}(h_{n_p-1}^T g(x_i)) \tag{13}$$

Since $N_p$ steps of "reads" are conducted, and attLSTM(f'(x̂),g(S),$N_p$)=$h_{N_p}$, where $h_{N_p}$ is given in equation (10).

Figure 5C:
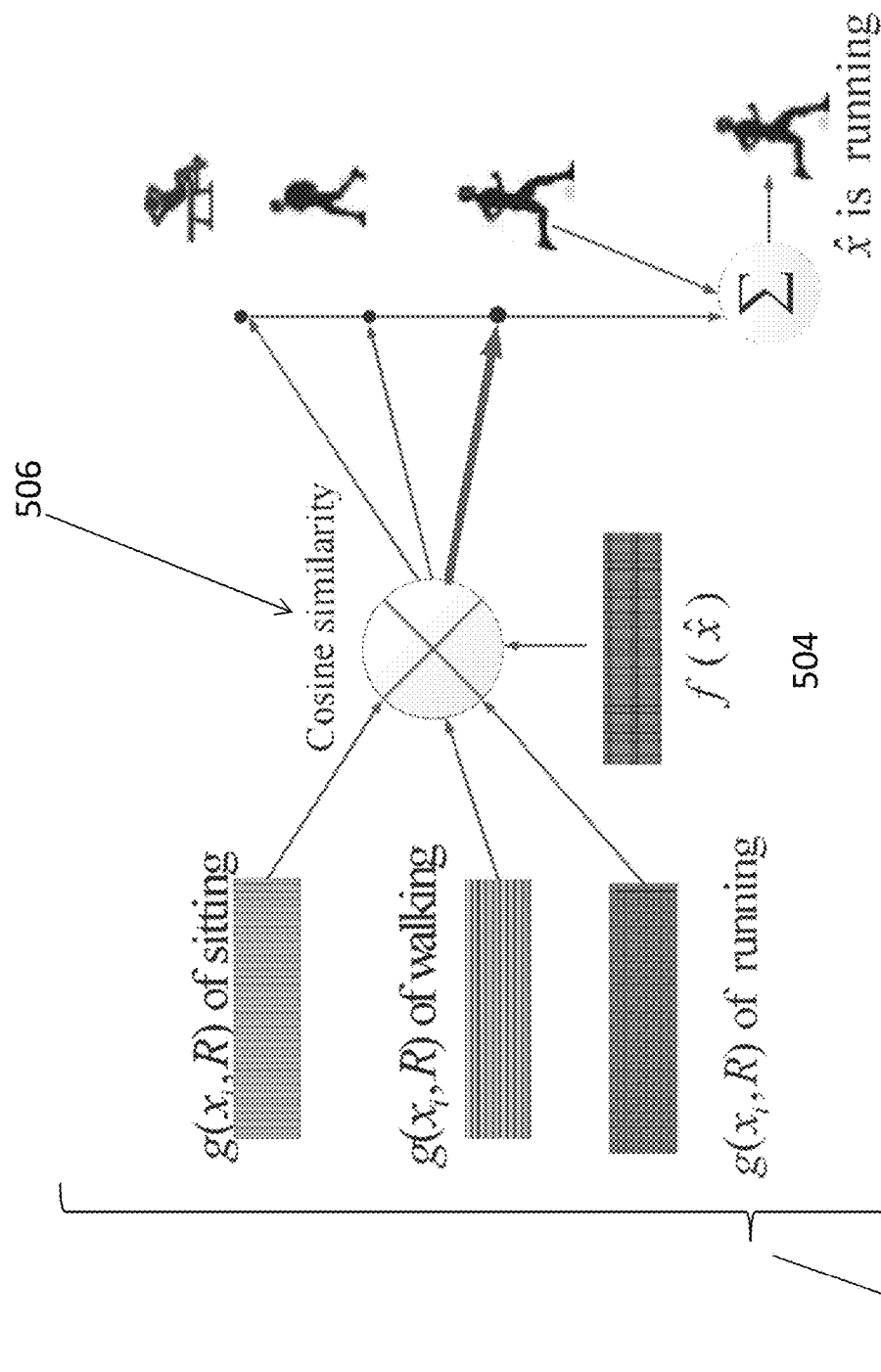
FIG. 5C is a block diagram of the classification stage of the matching engine of FIG. 1.
Figure 6:
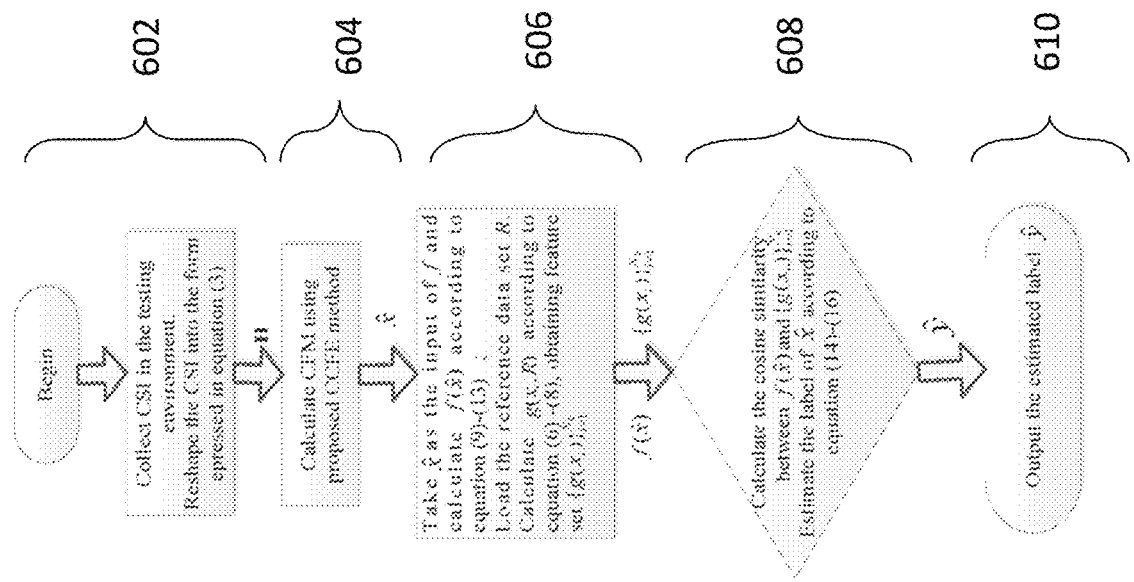
FIG. 6 is a data flow diagram of an example embodiment of a method for event recognition.

Once the above steps are performed to extract distinctive features, it is necessary for the MatNet 400 to perform a classification of the extracted features. The classification process begins with an estimation of the label ($\hat{y}$) for a given target data $\hat{x}$ using the features g($x_i$,R) and $f(\hat{x},R)$ (which are outputs of g and $f$ extracted from R and $\hat{x}$, respectively). Two input signals are involved in this stage, as shown in FIG. 5C. One is the reference feature set $\{g(x_i)\}_{i=1}^{N_k}$ 502 containing distinguishable features for all interested activities. Whilst the other input is the feature set $f(\hat{x})$ 504 extracted from the target data, which are unlabelled.

In this example, the classification stage operates similarly to a method of "nearest neighbour classification". This involves a calculation of the similarity 506 between the $f(\hat{x})$ 504 and $\{g(x_i)\}_{i=1}^{N_k}$ 502 for each activity or event. If $f(\hat{x})$ 504 is closer to ($x_i$) 502, $\hat{x}$ is assigned the same label as $x_i$.

One process to estimate $\hat{y}$ is by calculating the linear combination of y in the reference data set R, so (5) is equal to $$\hat{y}=\Sigma_{i=1}^{N_k}\text{att}(\hat{x},x_i)y_i \tag{14}$$

where $x_i$; $y_i$ are the CFM and the corresponding label from the reference data set R=$\{(x_i,y_i)\}_{i=1}^{N_k}$, and att is an attention mechanism in the form of softmax over the cosine similarity, which is defined as $$\text{att}(\hat{x},x_i)=\frac{e^{\cos(f(\hat{x}),g(x_i))}}{\sum_{j=1}^{N_k}e^{\cos(f(\hat{x}),g(x_j))}} \tag{15}$$

where cos($\alpha,\beta$) is the cosine similarity function and may be defined as $$\cos(\alpha,\beta)=\frac{\alpha\cdot\beta}{\|\alpha\|\,\|\beta\|} \tag{16}$$

As described above and with reference to FIGS. 5A, 5B and 5C, the MatNet 400 operates by using multiple learning networks, which in this example, are artificial neural networks to perform an embedding function of the signal information received from a PSE and from a new/testing environment. By embedding the two sources of signal information, the two sources of signal information can be compared with specific features that are extracted in both sources of signal information to be labelled and classified based on existing training data. Once classified, a similarity function can be performed to identify nearest neighbours of classified signal information and thus allowing extracted features of new signal information to be classified by comparison with existing trained vectors within the MatNet 400. In turn, allowing new signal information to be put through the MatNet 400 in order to obtain an output of an activity or event.

As shown in FIGS. 4A to 5(C), the MatNet is preferably trained before it will be able to recognize activities or events with an acceptable level of accuracy. Accordingly, and as described in the above examples where there is a unique MatNet 400 structure, a suitable training strategy arranged to take advantage of this MatNet structure may also be used to train the MatNet 400.

In one example training strategy, a two steps process is used to train the MatNet 400 with different data grouped into a reference data set and a target data set which are both subsequently used to train the MatNet 400. In the first step, the samples in the reference data set are devised from the previously scene environments (PSE), while the samples in the batch of target data are obtained from both the new/testing environment and the PSE.

The purpose of this first step of the training process is to build a relationship between the new/testing environment and the PSE with the more essential features for recognizing different activities and events being extracted. After this process, the trained network coefficients are frozen for a second training step. In the second step, the samples in both the reference data set and a batch of target data are from the new/testing environment. The MatNet 400 is then trained using the parameters obtained from the first step as mentioned above. This training step may be considered as a fine-tuning process which can help the MatNet 400 to better learn and extract the distinguishable features of human behaviours in the testing environment.

Embodiments of such training strategies may be advantageous as training resources can be minimize once the system for recognising activities or events is deployed. This is particularly the case as described in the above examples as the reference data set can be created before the system is deployed from a PSE, whilst the target data set can include fewer samples of training data obtained from a PSE and the new/testing environment. In turn, this will reduce the training load and resource for an end user who would be deploying the system within a new environment and any substantial training can be performed before the system for events recognition is deployed.

In another example training strategy as performed by the inventors during the trial of the MatNet 400, the training strategy includes the use of an episode-based training process which aims to see that the MatNet can perform events or activities recognition, and particularly Human Activity Recognition (HAR) in a new (testing) environment using the training data set from the PSE and at the minimum, one sample, from the new testing environment.

In this regard, assume that T denote a task which can be seen as a distribution over possible label sets of human activities. In each episode, L, a set of human activities, is sampled from T, L~T. L can be a label set which labels a particular human activity such as sitting; running; walking; running; standing up; sitting down; or empty (no label). Then L is used to sample the reference data set R and a batch of target set B, obtaining R=R~L and B=B~L.

The basic goal of training the MatNet 400 is to minimize the error from estimating the labels in the batch B conditional on R. Thus, the loss function of MatNet 400 based human activity recognition, $\mathcal{L}$, is expressed as $$\mathcal{L} = -E_{L\sim T}[E_{R,B}[\Sigma_{(x,y)\in B} \log P_\Omega(y|x,R)]] \quad (17)$$

where $\Omega=\{\Omega_1,\Omega_2\}$, $\Omega_1$ and $\Omega_2$ are the parameter sets of embedding functions g and f, respectively. The training objective is to minimize the loss function over a batch for a given reference data set R, which can be represented as $$\Omega = \frac{\arg\min \mathcal{L}(\Omega)}{\Omega} \quad (18)$$

In this example, for each episode, the training strategy includes two steps with different data in R and B. Preferably, in the first step, the samples in R are only from the PSE, while the samples in B are from both the testing environment and the PSE. Preferably, there is no overlap between R and B and thus the purpose of this step is to build a relationship between the testing environment and the PSE. In turn, allowing for essential features for recognizing different activities to be also extracted.

The trained MatNet coefficients are then frozen for the next training step, where, as a second step, the samples in both R and B are from the testing environment. The MatNet is trained based on R and B using the parameters obtained from the first step. This training step can be seen as a fine tuning process which can help the MatNet to better learn and extract the distinguishable features of human behaviors in the testing environment. Upon training MatNet in the offline phase, the network coefficients/parameters are frozen for online sensing. The detailed process of online sensing is provided in FIG. 6, which shows an example data flow process in which a system for events recognition can take collect signal information, in the form of CSI 602, preprocess this information into a CFM 604, perform a feature extraction 606, perform a classification 608 and finally provide an output of what the likely activity or event was within the predefined pace 610.

In some example embodiments, the outputs of the MatNet 400 may also be used to facilitate passive localization utilizing fingerprinting techniques. In this example, fingerprinting is an example method for localization of a person, animal or object and is advantageous over other localization techniques as it does not require line-of-sight measurements of access points (APs), whilst providing results of high accuracy and low complexity.

Figure 7:
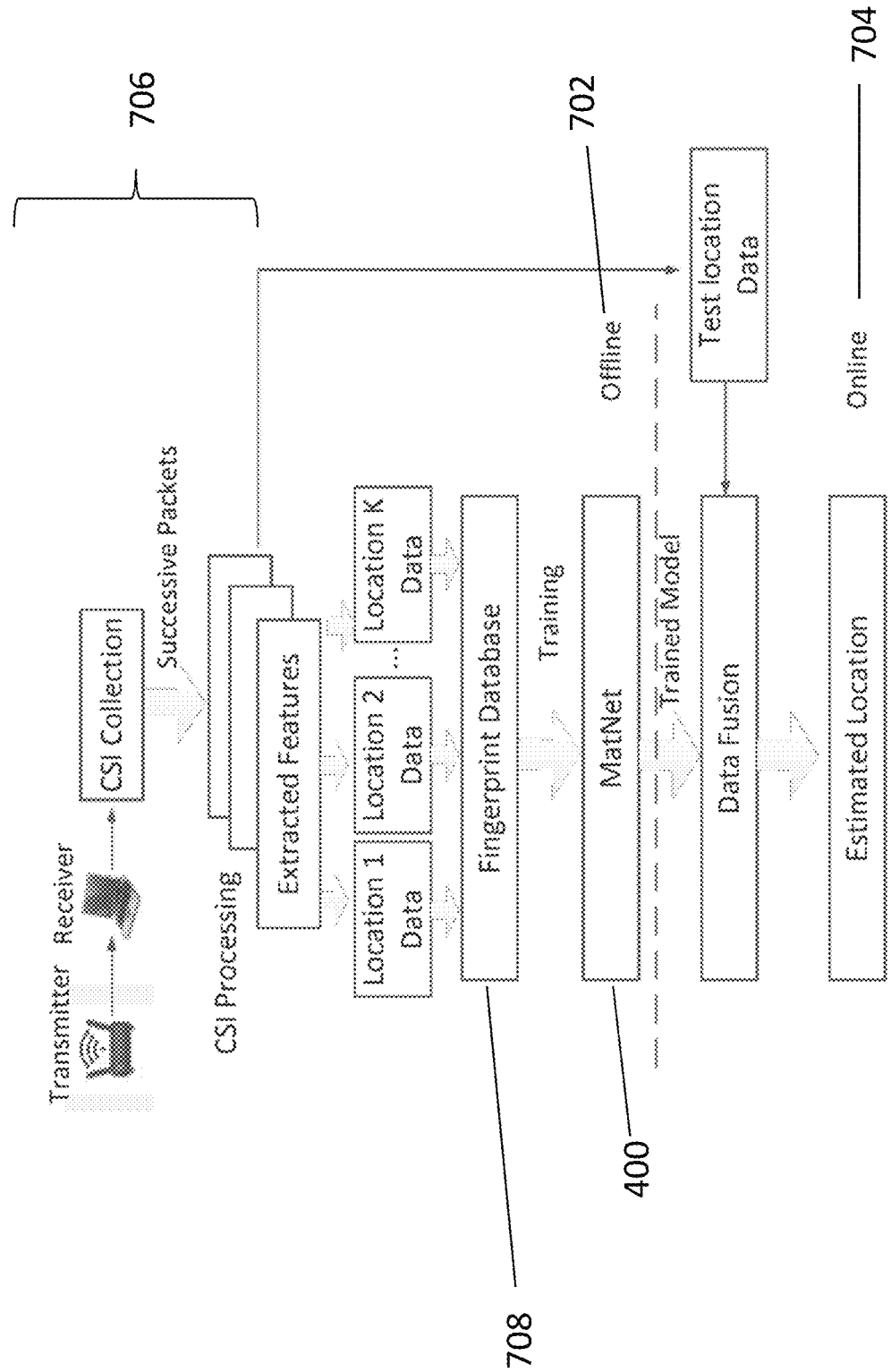
FIG. 7 is a block diagram of a MatNet adapted for passive localization in accordance with one example embodiment.

With reference to FIG. 7, an example embodiment of a system for localization of an object 700 comprising:
  segmentation processor arranged to segment a space into multiple segments, wherein a signal is propagated within the space;
  an event recognising module arranged to recognise an event in the multiple segments by a method in accordance with any one of claims 1 to 20; and
  a location output processor arranged to determine an estimated location based on the events recognised in the multiple segment.

In this embodiment, the system for localization of an object is based on a proposed MatNet 400 based passive localization system. The MatNet in this example, is based on the MatNet 400 that has been described above with reference to FIGS. 5A, 5B and 5C. As shown in FIG. 7, the localization is accomplished through two phases: offline training phase 702 and online sensing phase 704. In the offline phase, the system 700 is able to collect and preprocess the CSI information to extract the essential information 706, obtaining a feature set, e.g., $D_{en}^A$ and $D_{en}^\Psi$.

Once the feature set is obtained, a fingerprint database 708 is constructed for all grids in the whole environment. The constructed fingerprint database 708 is then input into the MatNet 400 network for training. In the online phase 704, the well-trained network may be used to detect a person's location. The CSI collection, CSI preprocessing and training strategy here are similar to those for activity or event recognition as presented above.

Figure 8:
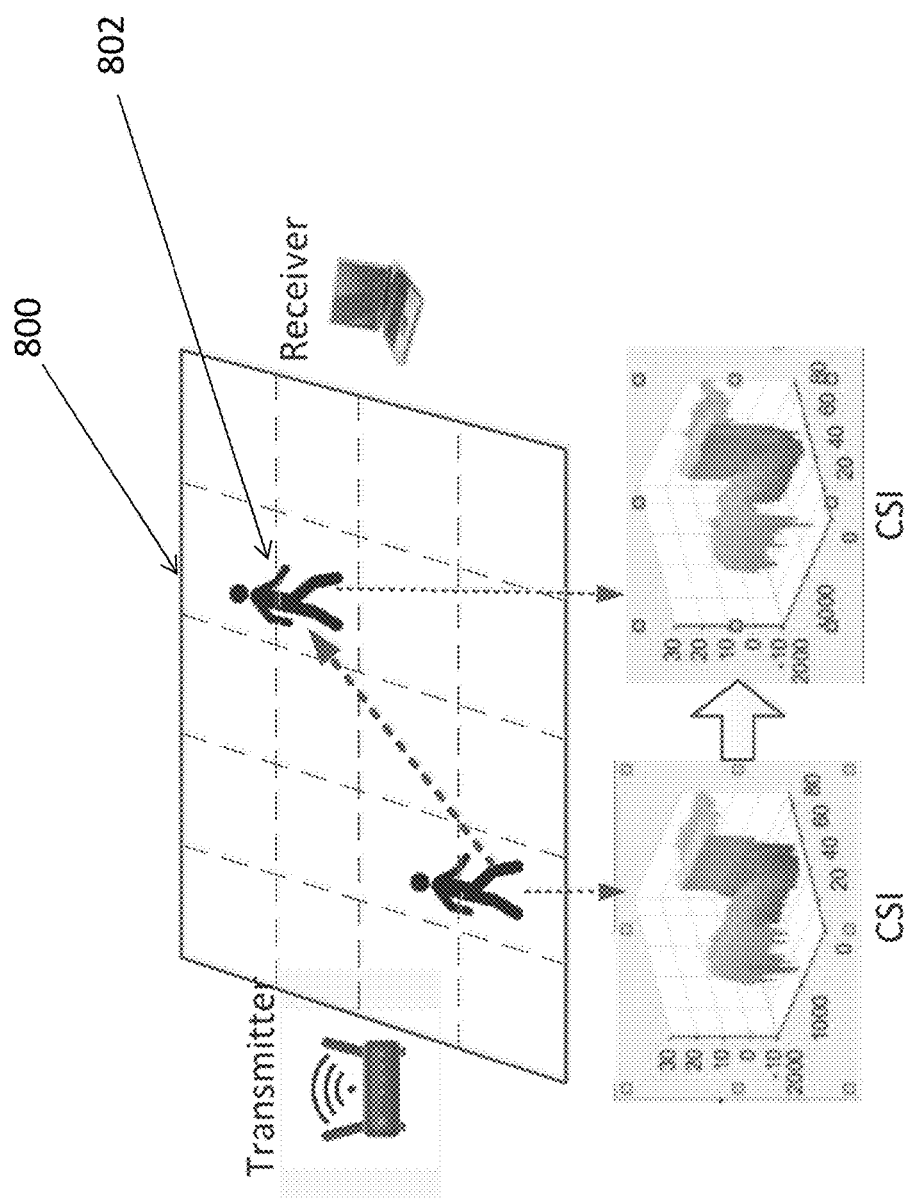
FIG. 8 is a chart illustrating the effect of a human location on a fingerprint database.

To construct the fingerprint database 708, the environment covered by the signal (WiFi Network) is firstly divide into K grids, as illustrated in FIG. 8. Each grid 800 has a unique label k, here k=1, 2, . . . , K.

From this figure, a person 802 is moving around in the room, leading to different fingerprint databases in different grids. Take the kth grid as a study case, let $\wedge_k$ denote the fingerprint database 708 of the kth grid, which includes $D_{en}^A$ and $D_{en}^\Psi$, angle of arrival (AoA), etc. Upon collecting the fingerprint database 708 from all the grids 800, the fingerprint database 708 for the whole environment can be obtained and is denoted as $\wedge_k$. From this point, MatNet can be applied to learn and extract deeper features $\wedge_k$ which are beneficial to accurately predict a person's location in turn, allowing the system 700 to accurately realize localization.

In another embodiment, the MatNet based passive localization as shown in FIG. 7 may also be extended to a scenario where the system uses multiple transceivers. In this example, different transmitter-receiver pairs are arranged to construct various fingerprint databases 708 for the same grid 800 of an environment. This is advantageous as the localization performance can be significantly improved by fusing and leveraging these distinctive features from the different transceivers.

Figure 9A:
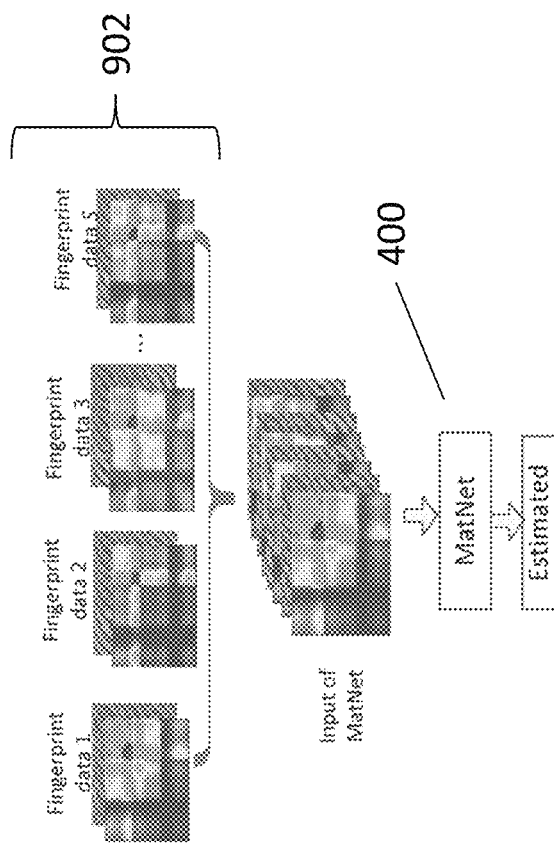
FIG. 9A is a block diagram of an example structure of a MatNet for use with multiple signal transceivers; and, FIG. 9B is a block diagram of another example structure of a MatNet for use with multiple signal transceivers.
Figure 9B:
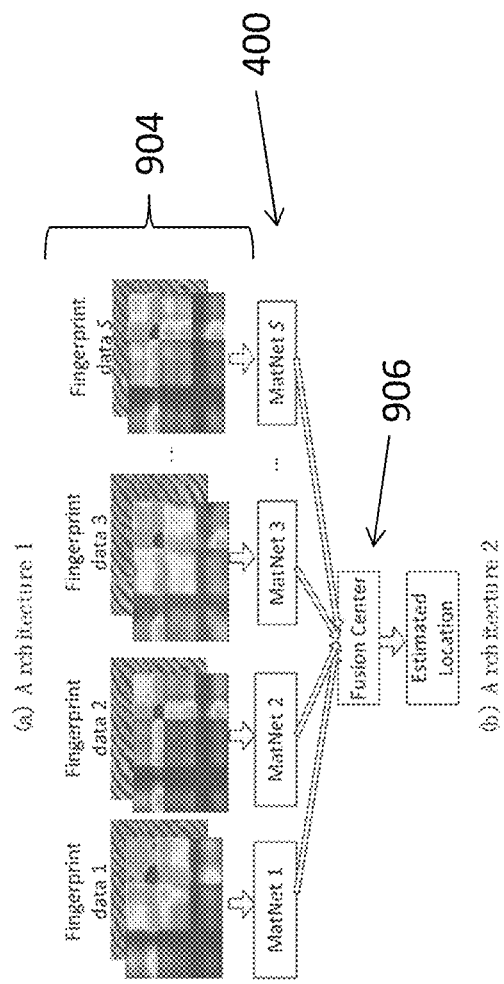

As shown in FIGS. 9(a) and 9(b), two architectures of MatNet arranged to operate with multiple transceivers are shown. In these examples, the MatNet 400 is arranged to learn and extract the distinctive features from different fingerprint databases of each grid. Preferably, there are S transmitter-receiver pairs. In the first architecture as shown in FIG. 9(a), S fingerprint databases 902 of each grid are fed into one MatNet 400 for feature extraction. In this way, more essential features of one grid can be effectively extracted, thereby improving the sensing performance.

In the second architecture, as shown in FIG. 9(b), the MatNet 400 is arranged to learn the features of each fingerprint database 904. The extracted features from S.MatNets are fused following a fusion rule 906 (e.g., vote decision, hard decision or soft decision). According to experiments performed by the inventors, the second architecture shown in FIG. 9(*b*) may achieve better localization performance than the first one at the cost of higher complexity.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for event recognition of one or more target activities in a monitored space, the method comprising the steps of:
   receiving and reading by a signal reader, disposed in the monitored space, an electromagnetic frequency (EMF) signal transmitted by a signal emitter over a defined space, wherein the signal includes channel state information (CSI) that is affected by an event of any persons, animals or objects between the signal emitter and the signal reader within the defined space,
   pre-processing by a pre-processing processor for extracting activities related information and constructing a correlation feature matrix (CFM), wherein the step of extracting activities related information comprises the step of reducing the CSI for static background objects by subtracting static objects CSI constructed from a linear recursive operation;
   processing the CFM with a matching engine, wherein the engine is arranged to train and extract with a learning network hidden features from the CFM of the signal for classifying the signal with one or more labels associated with the event, wherein the learning network is machine trained with a training data set having a plurality of CFM having amplitude and phase matrices of the signal and at least one output label associated with the event that affected the CSI of the signal, and determining whether the one or more labels are associated with a target activity; and
   outputting a notification to a user when a target activity is detected.

2. A method for event recognition in accordance with claim 1, wherein the learning network is arranged to extract features from the training data set.

3. A method for event recognition in accordance with claim 2, wherein the training data set includes a reference data set and a target data set.

4. A method for event recognition in accordance with claim 3, wherein the step of extracting features from the training data set includes embedding the reference data set.

5. A method for event recognition in accordance with claim 2, wherein the learning network is further arranged to classify the extracted features and label these classified extracted features with the one or more associated event labels.

6. A method for event recognition in accordance with claim 3, wherein the step of classifying the extracted features includes comparing the extracted features of the reference data set and the extracted features of the target data set and identifying any similarities between the extracted features.

7. A method for event recognition in accordance with claim 4, wherein the step of extracting features from the training data set further includes embedding the target data set.

8. A method for event recognition in accordance with claim 4, wherein the step of comparing for similarities between the extracted features of the reference data set and the extracted features of the target data set is performed with a cosine similarity function.

9. A method for event recognition in accordance with claim 8, wherein the reference data set is obtained from a previously scene environment (PSE).

10. A method for event recognition in accordance with claim 8, wherein the target data set is obtained from both the previously scene environment (PSE) and a new environment.

11. A method for event recognition in accordance with claim 7, wherein the embedding is performed by one or more deep learning networks.

12. A method for event recognition in accordance with claim 11, wherein the deep learning network arranged to embed the reference data set to extract reference data features is performed by a convolution neural network (CNN) with a bi-directional long short term memory network (LSTM).

13. A method for event recognition in accordance with claim 12, wherein the deep learning network arranged to embed the target data set to extract target data features is performed by a convolution neural network (CNN) with a read attention based long short term memory network (LSTM).

14. A system for localization of an object comprising:
   segmentation processor arranged to segment a space into multiple segments, wherein a signal is propagated within the space;
   an event recognising module arranged to recognise an event in the multiple segments by a method in accordance with claim 1; and
   a location output processor arranged to determine an estimated location based on the events recognised in the multiple segment.

15. A system for localization of an object in accordance with claim 14, wherein the system further includes a fingerprint database arranged to store the events recognised by the event recognising module in its segment.

16. A system for event recognition of one or more target activities in a monitored space, the system comprising:
- a signal reader disposed in the monitored space and arranged to receive and read an electromagnetic frequency (EMF) signal transmitted by a signal emitted over a defined space, wherein the signal includes channel state information (CSI) arranged to be affected by an event of any persons, animals or objects between the signal emitter and the signal reader within the defined space;
- a pre-processing processor adapted to extract activities related information and to construct a correlation feature matrix (CFM), wherein the extracting of activities related information comprises reducing the CSI for static background objects by subtracting static objects CSI constructed from a linear recursive operation;
- an activity recognition processor arranged to process the CFM with a matching engine, wherein the engine is arranged to train and extract with a learning network hidden features from the CFM of the signal for classifying the signal with one or more labels associated with the event, wherein the learning network is machine trained with a training data set having a plurality of CFM having amplitude and phase matrices of the signal and at least one output label associated with the event that affected the CSI of the signal, and wherein the activity recognition processor is further arranged to determine whether the one or more labels are associated with a target activity; and
- an output device arranged to notify a user when a target activity is detected.

17. A system for event recognition in accordance with claim 16, wherein the learning network is arranged to extract features from the training data set.

18. A system for event recognition in accordance with claim 17, wherein the training data set includes a reference data set and a target data set.

19. A system for event recognition in accordance with claim 17, wherein the learning network is further arranged to classify the extracted features and label these classified extracted features with the one or more associated event labels.

20. A system for event recognition in accordance with claim 18, wherein the learning network extracts features from the training data set by embedding the reference data set.

21. A system for event recognition in accordance with claim 18, wherein the step of classifying the extracted features includes comparing the extracted features of the reference data set and the extracted features of the target data set and identifying any similarities between the extracted features.

22. A system for event recognition in accordance with claim 20, wherein the learning network extracts features from the training data set by embedding the target data set.

23. A system for event recognition in accordance with claim 20, wherein the step of comparing for similarities between the extracted features of the reference data set and the extracted features of the target data set is performed with a cosine similarity function.

24. A system for event recognition in accordance with claim 23, wherein the reference data set is obtained from a previously scene environment (PSE).

25. A system for event recognition in accordance with claim 23, wherein the target data set is obtained from both the previously scene environment (PSE) and a new environment.

26. A system for event recognition in accordance with claim 22, wherein the embedding is performed by one or more deep learning networks.

27. A system for event recognition in accordance with claim 26, wherein the deep learning network arranged to embed the reference data set to extract reference data features is performed by a convolution neural network (CNN) with a bi-directional long short term memory network (LSTM).

28. A system for event recognition in accordance with claim 27, wherein the deep learning network arranged to embed the target data set to extract target data features is performed by a convolution neural network (CNN) with a read attention based long short term memory network (LSTM).

* * * * *